(12) United States Patent
Reichenbach-Klinke et al.

(10) Patent No.: US 8,975,362 B2
(45) Date of Patent: Mar. 10, 2015

(54) GRAFT COPOLYMER AS A GAS HYDRATE INHIBITOR

(75) Inventors: Roland Reichenbach-Klinke, Traunstein (DE); Karin Neubecker, Frankenthal (DE)

(73) Assignee: BASF SE, Ludwigshafen (DE)

( * ) Notice: Subject to any disclaimer, the term of this patent is extended or adjusted under 35 U.S.C. 154(b) by 1076 days.

(21) Appl. No.: 12/739,276

(22) PCT Filed: Dec. 5, 2008

(86) PCT No.: PCT/EP2008/066883
§ 371 (c)(1),
(2), (4) Date: Jun. 3, 2010

(87) PCT Pub. No.: WO2009/083377
PCT Pub. Date: Jul. 9, 2009

(65) Prior Publication Data
US 2010/0311617 A1  Dec. 9, 2010

(30) Foreign Application Priority Data
Dec. 28, 2007  (DE) .......................... 10 2007 063 060

(51) Int. Cl.
C08G 69/08 (2006.01)
C09K 8/524 (2006.01)
C08F 290/14 (2006.01)

(52) U.S. Cl.
CPC ............. C09K 8/524 (2013.01); C08F 290/145 (2013.01)
USPC ....................................................... 528/310

(58) Field of Classification Search
USPC ....................................................... 528/310
See application file for complete search history.

(56) References Cited

U.S. PATENT DOCUMENTS

| | | | |
|---|---|---|---|
| 3,092,512 A | 6/1963 | Magat et al. | |
| 4,254,239 A * | 3/1981 | Straub et al. | 525/123 |
| 4,388,428 A | 6/1983 | Kuzma et al. | |
| 5,207,941 A | 5/1993 | Kroner et al. | |
| 5,480,427 A * | 1/1996 | Kelman et al. | 623/6.59 |
| 6,331,508 B1 | 12/2001 | Pakulski | |
| 6,451,892 B1 | 9/2002 | Bakeev et al. | |
| 6,681,856 B1 | 1/2004 | Chatterji et al. | |
| 6,716,903 B1 | 4/2004 | Baumeister | |
| 6,840,319 B1 | 1/2005 | Chatterji et al. | |
| 6,867,262 B1 | 3/2005 | Angel et al. | |
| 7,214,814 B2 | 5/2007 | Dahlmann et al. | |
| 2006/0058449 A1 | 3/2006 | Angel et al. | |
| 2008/0255326 A1 | 10/2008 | Widmaier et al. | |
| 2009/0306290 A1 | 12/2009 | Bucevschi et al. | |

FOREIGN PATENT DOCUMENTS

| | | |
|---|---|---|
| CA | 2660589 | 2/2008 |
| DE | 4129901 A1 | 3/1993 |
| DE | 19 936 476 | 7/2000 |
| DE | 19935063 A1 | 2/2001 |
| DE | 101 63 259 | 2/2003 |
| DE | 102 38 176 | 3/2004 |
| DE | 103 14 354 | 6/2004 |
| DE | 10 2005 05 30 64 | 5/2007 |
| DE | 10 2006 038 809 | 2/2008 |
| EP | 0457205 A2 | 11/1991 |
| EP | 1 450 004 | 8/2004 |
| GB | 901039 A | 7/1962 |
| WO | WO 83/00339 | 2/1983 |
| WO | WO 96/41784 | 12/1996 |
| WO | WO 2004/042190 | 5/2004 |
| WO | WO 2005/084724 | 9/2005 |
| WO | WO-2008/019987 A1 | 2/2008 |
| WO | WO-2009/019050 A1 | 2/2009 |

\* cited by examiner

*Primary Examiner* — Ling Choi
*Assistant Examiner* — Thuy-Ai Nguyen
(74) *Attorney, Agent, or Firm* — Fulbright & Jaworski LLP

(57) ABSTRACT

Graft copolymers based on a polyamide which was reacted with maleic anhydride and which has at least one vinylically unsaturated side chain are proposed, this grafted side chain containing at least one representative selected from a) N-vinylcaprolactam and/or b) N-vinylpyrrolidone. Inter alia, natural but also synthetic polyamides are provided as preferred polyamide components. Such graft copolymers, but also generally polyamide-based graft copolymers composed of at least one side chain containing ethylenically unsaturated compounds, are in general suitable in construction chemistry applications but also in the development, exploitation and completion of underground mineral oil and natural gas deposits and in deep wells and moreover in the extraction and the transport of oil or gas and here in particular as a gas hydrate inhibitor.

21 Claims, No Drawings

GRAFT COPOLYMER AS A GAS HYDRATE INHIBITOR

This application is a §371 of PCT/EP2008/066883 filed on Dec. 5, 2008, and claims priority from DE 10 2007 063 060.5 filed Dec. 28, 2007.

The present invention relates to graft copolymers based on a polyamide and the use thereof.

Water-soluble, biodegradable polyamide-based copolymers and the use thereof are disclosed in German laid-open application DE 103 14 354 A1. The copolymers described there have at least one grafted-on side chain, composed of aldehydes and sulphur-containing acids and optionally of at least one compound from the series consisting of ketones, aromatic alcohols, urea derivatives and amino-s-triazines. Natural polyamides, such as caseins, gelatins and collagens, are mentioned as preferred polyamide components. The copolymers described here are used in particular as plasticizers or water retention agents for inorganic binders and pigments.

U.S. Pat. No. 6,840,319 is concerned, inter alia, with compositions and biodegradable additives for fluid loss control in the cementing of underground formation zones. This additive is a condensate of gelatin, formaldehyde, sodium sulphite and acetone, and hydroxyethylcellulose substituted by ethylene oxide.

U.S. Pat. No. 6,681,856 relates to a process for the cementing of underground zones, in which biodegradable dispersants are utilized. The respective dispersants comprise a polyamide-based graft polymer which contains at least one side chain which is derived from aldehyde and sulphur-containing acids or salts thereof.

The unpublished patent application DE 10 2006 038 809.7 describes the use of polyamide-based copolymers which contain at least one grafted-on side chain composed of ethylenically unsaturated compounds in construction chemistry applications, and in the development, exploitation and completion of underground mineral oil and natural gas deposits and in deep wells.

Graft copolymers and in particular those based on a polyamide are therefore very well known from the relevant prior art and in particular in relation to the development, exploitation and completion of underground mineral oil and natural gas deposits. In addition to the cementing of wells, the control of the behaviour of aqueous building material systems in underground formations and the reduction of the inflow of water in the extraction of oil or gas, there are however also subsequent problems in relation to the development, exploitation and completion of underground mineral oil and natural gas deposits, for which problems optimum technical solutions still have not been found.

A specific example of this is the formation of so-called gas hydrates, which can form during the transport of water-containing mineral oil or natural gas mixtures through pipelines. Gas hydrates are in general crystalline inclusion compounds of gas molecules, such as, for example, methane, ethane or propane, in water. These ice-like compounds form at low temperatures and high pressures and can exist substantially above the freezing point of water up to more than 25° C. in some cases, depending on the respective pressure conditions and gas compositions. These gas hydrates may also occur in water-containing mineral oil and natural gas mixtures and thus lead to blockage to the transport facilities and pipelines in the transport of mineral oil or natural gas.

In order to avoid this, gas hydrate inhibitors which slow down or prevent crystal formation are used.

A multiplicity of different substances can be used as kinetic gas hydrate inhibitors. Thus, for example, EP 1450004 A1 describes the use of certain quaternary ammonium compounds as gas hydrate inhibitor, while DE 10163259 A1 discusses the use of modified polyvinyl alcohols and U.S. Pat. No. 6,331,508 discusses the use of polyoxyalkylenediamines.

Synthetic polymers which have cyclic (pyrrolidone or caprolactam radicals) or acyclic amide structures in the side groups are particularly effective as kinetic gas hydrate inhibitors. Such polymers are described, for example, in U.S. Pat. No. 6,451,892, WO 2004/042190 A1 or WO 96/41784 A1.

Furthermore, various graft polymers which contain these amide structures are also known. Thus, for example, DE 19935063 A1 and DE 10 2005 05 30 64 A1 describe graft polymers based on polyalkylene glycol.

A disadvantage of the gas hydrate inhibitors described is that these products are not biodegradable or are only insufficiently biodegradable. However, for readily comprehensible reasons, biodegradability is being increasingly demanded by the users but also by the legislator and the authorities.

Graft copolymers of N-vinylpyrrolidone (NVP) and gelatin as the polyamide component are known, for example, from J. Appl. Polym. Sci. 68 (1998) 1485-1492, J. Appl. Polym. Sci. 55 (1995) 1291-1299, and J. Photographic sci. 40 (1992) 248-251. Eur. Polym. J. 21 (1985) 195-199 also described the grafting of NVP onto gelatin and additionally the use of these graft copolymers as plasma expanders. In J. Appl. Polym. Sci. 12 (1968) 1557-1565, NVP is grafted photochemically onto collagen and other fiber proteins.

Hydrogels which are used inter alia in the production of contact lenses are described in WO 83/00339 A1. These hydrogels are obtainable by grafting various monomers, including NVP and N-vinylcaprolactam (NVC), onto collagen or gelatin as a polyamide substrate. DE 19 936 476 A1 describes a coating slip which is used in the production of printable papers. The coating slip described there contains, inter alia, graft copolymers of gelatin and NVP or NVC. Analogous copolymers which are additionally crosslinked are described in DE 102 38 176 A1.

Biodegradable superabsorbers, which can be prepared by reacting a natural polymer with a synthetic polymer, are described in WO 2005/084724 A1. Inter alia, gelatin and collagen are mentioned as natural polymers; NVP and NVC are mentioned as a constituent of the synthetic polymer.

In view of the described disadvantages of the prior art, it is the object of the present invention to provide novel graft copolymers based on the polyamide which was reacted with maleic anhydride and which contains at least one vinylically unsaturated side chain, in particular the suitability thereof as gas hydrate inhibitors being of primary importance regarding the use. In relation to this special application, it was intended in particular to provide graft copolymers which are biodegradable. Moreover, the novel graft copolymers should be capable of being prepared by a relatively economical and simple procedure and using of readily obtainable starting materials.

This object was achieved by virtue of the fact that the graft copolymers according to the invention which are based on a polyamide contain, as a grafted side chain, at least one representative selected from a) N-vinylcaprolactam and/or b) N-vinylpyrrolidone.

The reaction of the polyamide of maleic anhydride, which takes place before the actual grafting, is a substantial advantage of the graft copolymers according to the invention compared with the prior art, since particularly efficient and complete grafting of NVC and/or NVP can be achieved by this procedure.

Surprisingly, it was found that not only can these graft copolymers according to the invention be prepared in good quality and in a simple manner according to the object but that such graft copolymers are also outstandingly suitable as kinetic gas hydrate inhibitors which moreover are as a rule very readily biodegradable, said gas hydrate inhibitors being extremely storage-stable and insensitive to transport during storage until their actual use.

As a preferred polyamide component, the graft copolymers according to the present invention are based on at least one compound of the series consisting of the natural polyamides and particularly preferably caseins, gelatins, collagens, bone glues, blood albumens, soya proteins and the degradation products thereof formed by oxidation, hydrolysis or depolymerization. In addition, however, the equivalent synthetic polyamides are also suitable and in this case likewise once again the degradation products thereof which are formed by oxidation, hydrolysis or depolymerization, and generally mixtures of the proposed polyamide variants.

Variants of the graft copolymers according to the invention which contain the polyamide component in proportions of 10 to 95% by weight and preferably of 50 to 70% by weight have proved to be particularly advantageous. Regarding the side chains, too, the present invention comprises specific variants, graft copolymers whose side chain monomers a) and b), independently of one another and in each case based on the total graft copolymer, are present in proportions of 5 to 90% by weight, preferably of 15 to 60% by weight and particularly preferably of 30 to 50% by weight being of particular interest.

As already stated several times in the appreciation of the closest prior art, in overcoming the known disadvantages particular attention was paid to ensuring that the graft copolymers of the present invention are easily and particularly economically obtainable. For this reason, an invention takes into account graft copolymers which can be prepared by a) introducing at least one reactive double bond into the polyamide component and b) polymerizing the side chain monomers a) and/or b) subsequently at the at least one double bond introduced.

It is to be regarded as being particularly preferred that process step a) was carried out by reaction of the polyamide component with at least 1% by weight of maleic anhydride.

The preparation of the graft copolymers according to the invention is in general not subject to any particular limitation and there is also no need to ensure specific process parameters. Nevertheless, in the context of the present invention, it is advisable to carry out process steps a) and/or b) at temperatures between −10° C. and 250° C., preferably between 0 and 100° C., and, independently of the chosen reaction temperature, particularly preferably in the presence of a solvent and here in particular of a polar solvent, such as water or dimethyl sulphoxide.

As a further variant of the present invention, it is possible additionally to crosslink the graft copolymer after process stages a) and b), which can be effected in particular with the aid of polyfunctional and ethylenically unsaturated compounds, such as, for example, di- or trimethacrylates.

The graft copolymers according to the present invention which are obtainable, inter alia, in this manner are distinguished by a molar mass $\overline{M}_n$ of >5000 g/mol and in particular >10 000 g/mol.

A further advantageous feature of the graft copolymers according to the invention is the water solubility thereof, but also the biodegradability associated therewith. Both features considered by themselves are preferred properties which are likewise comprised by the present invention.

In addition to the properties of the novel graft copolymers and their preparation process, the present invention is also distinguished by the spectrum of use thereof:

Thus, the graft copolymers described can be used in particular in construction chemistry applications and in the development, exploitation and completion of underground mineral oil and natural gas deposits, but also in deep wells.

A further aspect is the use of the graft copolymers described in the extraction and the transport of oil or gas and in this context in particular as gas hydrate inhibitors, where their use as biodegradable, kinetic gas hydrate inhibitors is to be regarded as being particularly advantageous.

The present invention furthermore comprises the use of polyamide-based graft copolymers composed of at least one side chain containing ethylenically unsaturated compounds, in general and without further specific structural features, in the extraction and the transport of oil or gas. In this context, the use as a gas hydrate inhibitor is once again regarded as being extremely advantageous.

The above-described use of the specific graft copolymers is distinguished in particular in that the graft copolymer contains, as the polyamide component, at least one compound from the series consisting of the natural polyamides and particularly preferably caseins, gelatins, collagens, bone glues, blood albumens, soya proteins and the degradation products thereof formed by oxidation, hydrolysis or depolymerization. In this case too, synthetic polyamides and in turn also the degradation products thereof formed by oxidation, hydrolysis or depolymerization are furthermore suitable. Of course, any suitable mixtures thereof can also be used.

These graft copolymers also have their advantageous properties and effects when they contain the polyamide component in proportions of 10 to 95% by weight and preferably of 50 to 70% by weight.

It is moreover to be regarded as being very advantageous if all graft copolymers of the present invention which are described contain, as the ethylenically unsaturated compound, at least one representative of the series consisting of the vinyl ethers in their O,S,P or N forms, and preferably as N-vinylamide, such as N-vinylcaprolactam, N-vinylpyrrolidone or N-methyl-N-vinylacetamide, acrylic acid, methacrylic acid, 2-ethyl-acrylic acid, 2-propylacrylic acid, vinylacetic acid, crotonic and isocrotonic acid, maleic acid, fumaric acid, itaconic acid, citraconic acid and amides thereof, vinylphosphonic acid, vinylsulphonic acid, vinylalkoxysilanes, methallylsulphonic acid and the styrenes.

Particular advantages are observable according to the invention when the graft copolymers are graft copolymers based on a polyamide which was reacted with maleic anhydride and which has at least one vinylically unsaturated side chain, the grafted side chain then being at least one representative selected from a) N-vinylcaprolactam and/or b) N-vinylpyrrolidone.

All graft copolymers described within the scope of this invention are water-soluble and moreover biodegradable and are used in conjunction with the extraction, the storage and transport of mineral oil and natural gas and here in particular for avoiding gas hydrate inhibitors.

Particularly efficient grafting onto the polyamide and in particular a gelatin substrate is permitted by the synthesis route likewise described, this procedure being substantially less susceptible to impurities or variations in the raw material quality than the direct grafting of ethylenically unsaturated compounds onto natural or synthetic polyamides and in particular gelatin.

The following examples illustrate the advantages of the present invention.

EXAMPLES

Preparation Example 1

65 g of a hydrolysis product of gelatin (PB Gelatines) were dissolved in 130 g of water. Thereafter, the solution was heated to 70° C. and 1.5 g of maleic anhydride together with 9.8 g of 20% strength NaOH were added so that a pH of about 8.5 resulted. After the reaction was carried out for 2 h at 70° C., 36.6 g of N-vinylcaprolactam in 126 g of 2-propanol were metered in. Thereafter, 1.4 g of tetraethylenepentamine and 0.03 g of sodium dodecylsulphate were added and the polymerization was initiated by adding 0.7 g of Wako V50. After a reaction time of 1 h, the reaction mixture was concentrated on a rotary evaporator. A yellowish, crystalline solid was obtained.

The total reaction was carried out under inert gas ($N_2$).

Preparation Example 2

65 g of a hydrolysis product of gelatin (PB Gelatines) were dissolved in 130 g of water. Thereafter, the solution was heated to 70° C. and 1.5 g of maleic anhydride together with 14.4 g of 20% strength NaOH were added so that a pH of about 8.5 resulted. After the reaction was carried out for 2 h at 70° C., 36.6 g of N-vinylcaprolactam in 126 g of ethylene glycol were metered in. Thereafter, 0.04 g of sodium dodecylsulphate is added, the pH is adjusted to about 7.6 with sulphuric acid and the polymerization is initiated by adding 1.45 g of Wako V50. After a reaction time of 1 h, the reaction was terminated and the pH was adjusted to 9.5 with NaOH. A yellowish, turbid solution having a viscosity of 860 mPa·s was obtained.

The total reaction was carried out under inert gas ($N_2$).

Preparation Example 3

65 g of a hydrolysis product of gelatin (PB Gelatines) were dissolved in 130 g of water. Thereafter, the solution was heated to 70° C. and 1.5 g of maleic anhydride together with 12.5 g of 20% strength NaOH were added so that a pH of about 8.5 resulted. After the reaction was carried out for 2 h at 70° C., 20.3 g of N-vinylcaprolactam and 16.2 g of N-vinylpyrrolidone in 126 g of ethylene glycol were metered in. Thereafter, 0.04 g of sodium dodecylsulphate was added, the pH was adjusted to about 7.6 with sulphuric acid and the polymerization was initiated by adding 1.45 g of Wako V50. After a reaction time of 1 h, the reaction was terminated, the reaction mixture was diluted with 182 g of water and the pH was adjusted to about 9.5 with NaOH. A clear solution having a viscosity of 11 300 mPa·s was obtained.

The total reaction was carried out under inert gas ($N_2$).

Preparation Example 4

65 g of a hydrolysis product of gelatin (PB Gelatines) were dissolved in 130 g of water. Thereafter, the solution was heated to 70° C. and 1.5 g of maleic anhydride together with 12.8 g of 20% strength NaOH were added so that a pH of about 8.5 resulted. After the reaction was carried out for 2 h at 70° C., 21.4 g of N-vinylcaprolactam and 15.2 g of N-methyl-N-vinylacetamide in 128 g of ethylene glycol were metered in. Thereafter, 0.04 g of sodium dodecylsulphate was added, the pH was adjusted to about 7.6 with sulphuric acid and the polymerization was initiated by adding 1.45 g of Wako V50. After a reaction time of 1 h, the reaction was terminated and the pH was adjusted to about 9.5 with NaOH. A clear solution having a viscosity of 540 mPa·s was obtained.

The total reaction was carried out under inert gas ($N_2$).

Preparation Example 5

70 g of a hydrolysis product of gelatin (PB Gelatines) were dissolved in 139 g of water. Thereafter, the solution was heated to 70° C. and 1.6 g of maleic anhydride together with 13.8 g of 20% strength NaOH were added so that a pH of about 8.5 resulted. After the reaction was carried out for 2 h at 70° C., 21.7 g of N-vinylcaprolactam in 95 g of ethylene glycol were metered in. Thereafter, 0.04 g of sodium dodecylsulphate was added, the pH was adjusted to about 7.6 with sulphuric acid and the polymerization was initiated by adding 0.86 g of Wako V50. After a reaction time of 1 h, the reaction was terminated and the pH was adjusted to about 9.5 with NaOH. A yellowish, slightly turbid solution having a viscosity of 190 mPa·s was obtained.

The total reaction was carried out under inert gas ($N_2$).

Preparation Example 6

65 g of a hydrolysis product of gelatin (PB Gelatines) were dissolved in 130 g of water. Thereafter, the solution was heated to 70° C. and 1.5 g of maleic anhydride together with 12.9 g of 20% strength NaOH were added so that a pH of about 8.5 resulted. After the reaction was carried out for 2 h at 70° C., 36.6 g of N-vinylcaprolactam in 126 g of ethylene glycol were metered in. Thereafter, 0.04 g of sodium dodecylsulphate and 5.0 g of sodium hypophosphite was added, the pH was adjusted to about 7.6 with sulphuric acid and the polymerization was initiated by adding 1.45 g of Wako V50. After a reaction time of 1 h, the reaction was terminated and the pH was adjusted to about 9.5 with NaOH. A yellowish, clear solution having a viscosity of 100 mPa·s was obtained.

The total reaction was carried out under inert gas ($N_2$).

Preparation Example 7

65 g of a hydrolysis product of gelatin (PB Gelatines) were dissolved in 130 g of water. Thereafter, the solution was heated to 70° C. and 1.5 g of maleic anhydride together with 12.5 g of 20% strength NaOH were added so that a pH of about 8.5 resulted. After the reaction was carried out for 2 h at 70° C., 30.5 g of N-vinylcaprolactam and 6.1 g of N-vinylpyrrolidone in 126 g of ethylene glycol were metered in. Thereafter, 0.04 g of sodium dodecylsulphate was added, the pH was adjusted to about 7.6 with sulphuric acid and the polymerization was initiated by adding 1.45 g of Wako V50. After a reaction time of 1 h, the reaction was terminated, the reaction mixture was diluted with 211 g of water and the pH was adjusted to about 9.5 with NaOH. A clear solution having a viscosity of 900 mPa·s was obtained.

The total reaction was carried out under inert gas ($N_2$).

Use Example (1) for Gas Hydrate Inhibition

A solution having a concentration of 9000 ppm was prepared from the graft copolymer obtained according to the preparation example, using deionized water. 120 ml of the solution were then introduced into a clean and dry 300 ml steel autoclave. The solution was stirred with a Teflon-coated stirrer bar at 500 revolutions per minute during the entire test.

The gas space above the aqueous solution was flushed at room temperature for about 1 min with Mungo-2 gas (composition of Mungo-2-gas: 1.75 mol % of $N_2$; 1.36 mol % of $CO_2$; 79.29 mol % of methane; 10.84 mol % of ethane; 4.63 mol % of propane; 0.62 mol % of isobutane; 1.12 mol % of n-butane; 0.2 mol % of isopentane; 0.19 mol % of n-pentane). The solution was then cooled to 4° C. at atmospheric pressure under an atmosphere of Mungo-2 gas.

Thereafter, Mungo-2 gas was forced in up to a pressure of 30 bar (gauge pressure), a waiting time of 10 min was allowed and the internal pressure was adjusted again to 30 bar with the aim of substantial compensation of a pressure drop which is caused by dissolution of the gas in the cold solution under 30 bar pressure.

Finally, the autoclave was completely closed and the internal pressure was continuously measured at constant internal temperature and with constant stirring. The timespan in which the internal pressure had fallen to <29 bar was assessed as the inhibition time. The greater this inhibition time, the better the action as a gas hydrate inhibitor.

| Gas hydrate inhibitor | Inhibition time |
| --- | --- |
| Zero value without addition of inhibitor (comparison) | 1 h 20 min |
| Graft copolymer according to preparation example 1 (invention) | 35 h |
| Graft polymer according to preparation example 3 (invention) | 174 h |
| Graft copolymer according to preparation example 4 (invention) | >360 h |

The example shows that the addition of the graft copolymer according to the invention substantially delays the formation of gas hydrates.

Use Example 2 for Gas Hydrate Inhibition

Procedure analogous to use example 1, except that methane gas at a pressure of 60 bar was used instead of Mungo-2 gas.

| Gas hydrate inhibitor | Inhibition time |
| --- | --- |
| Graft copolymer according to preparation example 2 (invention) | >350 h |

The invention claimed is:

1. A graft copolymer based on a polyamide which was reacted with maleic anhydride, wherein the graft copolymer comprises at least one vinylically unsaturated side chain, comprising a grafted side chain, wherein the grafted side chain comprises at least one member selected from the group consisting of a) N vinylcaprolactam and b) N-vinylpyrrolidone, wherein the graft copolymer is biodegradable, wherein the polyamide is natural.

2. A graft copolymer according to claim 1, wherein the polyamide is a degradation product thereof formed by oxidation, hydrolysis or depolymerization.

3. A graft copolymer according to claim 1, wherein the polyamide in is present in an amount of from 10 to 95% by weight.

4. A graft copolymer according to claim 1, wherein the graft copolymer contains the side chain monomers a) and b), independently of one another and in each case based on the total graft copolymer, in proportions of 5 to 90% by weight.

5. A graft copolymer according to any of claim 1, wherein the reaction includes the steps of 1) introducing at least one reactive double bond into the polyamide and 2) subsequently polymerizing the side chain monomers a) and/or b) at the at least one double bond introduced.

6. A graft copolymer according to claim 5, wherein process step a) was carried out by reaction of the polyamide with at least 1% by weight of maleic anhydride.

7. A graft copolymer according to claim 5, wherein at least one of process steps 1) and 2) were carried out at a temperature between −10° and 250° C. in the presence of a polar solvent.

8. A graft copolymer according to any of claim 5, wherein the graft copolymer is additionally crosslinked after reaction steps 1) and 2) with the aid of a polyfunctional, ethylenically unsaturated compound.

9. A graft copolymer according to claim 1, wherein the graft copolymer has a molar mass $M_n$ of >5,000 g/mol.

10. A graft copolymer based on a polyamide which has been reacted with maleic anhydride, wherein the graft copolymer comprises:
    at least one vinylically unsaturated side chain; and
    a grafted side chain comprising at least one member selected from the group consisting of a) N vinylcaprolactam and b) N-vinylpyrrolidone, wherein the graft polymer is water-soluble and the polyamide is natural.

11. A method comprising using the graft copolymer according to any of claim 1 in a construction chemistry application or in the development, exploitation and completion of underground mineral oil and natural gas deposits or in deep wells.

12. The method of claim 11, wherein oil or gas is extracted or transported.

13. A graft copolymer based on a polyamide which was reacted with maleic anhydride, wherein the graft copolymer comprises at least one vinylically unsaturated side chain, comprising a grafted side chain, wherein the grafted side chain comprises at least one member selected from the group consisting of selected from the group consisting of a) N vinylcaprolactam and b) N-vinylpyrrolidone; and wherein the polyamide is natural.

14. A graft copolymer according to claim 13, wherein the polyamide selected from the group consisting of a natural polyamide a synthetic polyamide and degradation products thereof formed by oxidation, hydrolysis or depolymerization and mixtures thereof.

15. A graft copolymer according to claim 13, wherein the polyamide is present in an amount of from 10 to 95% by weight.

16. A graft copolymer according to claim 13, wherein the graft copolymer comprises side chain monomers a) and b), independently of one another and in each case based on the total graft copolymer, in proportions of 5 to 90% by weight.

17. A graft copolymer according to any of claim 13, wherein the reaction includes the steps of 1) introducing at least one reactive double bond into the polyamide component and 2) subsequently polymerizing the side chain monomers a) and/or b) at the at least one double bond introduced.

18. A graft copolymer according to claim 17, wherein process step a) is carried out by reaction of the polyamide component with at least 1% by weight of maleic anhydride.

19. A graft copolymer according to claim 17, wherein at least one of process steps 1) and 2) were carried out at a temperature between −10° and 250° C. in the presence of a polar solvent.

20. A graft copolymer according to any of claim 17, wherein the graft copolymer is additionally crosslinked after reaction steps 1) and 2) with the aid of a polyfunctional, ethylenically unsaturated compound.

21. A graft copolymer according to claim 13 having a molar mass $M_n$ of >5,000 g/mol.

* * * * *